Nov. 26, 1935.  E. J. SWEETLAND  2,022,164

WATER FILTERING AND COOLING MEANS

Filed Nov. 7, 1932  2 Sheets-Sheet 1

INVENTOR.
Ernest J Sweetland

Nov. 26, 1935.  E. J. SWEETLAND  2,022,164
WATER FILTERING AND COOLING MEANS
Filed Nov. 7, 1932  2 Sheets-Sheet 2
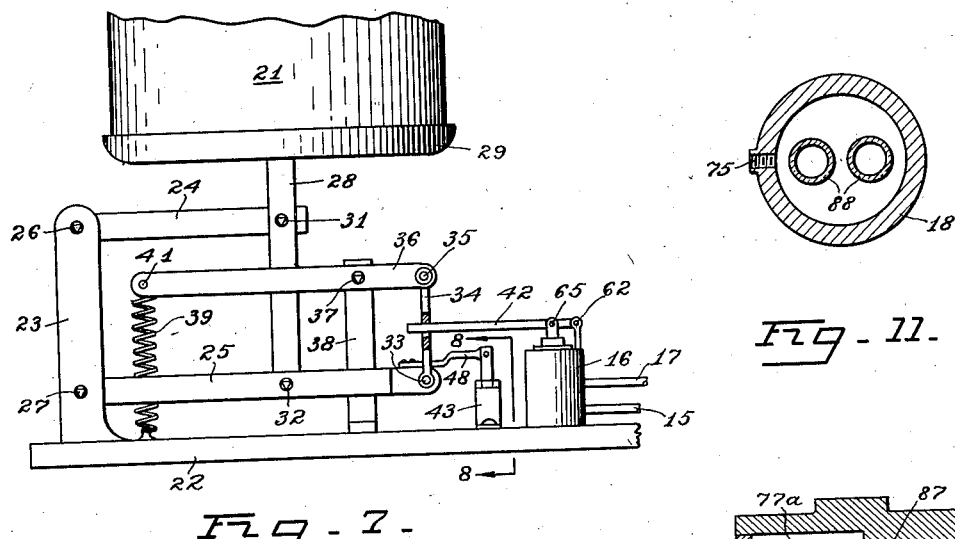
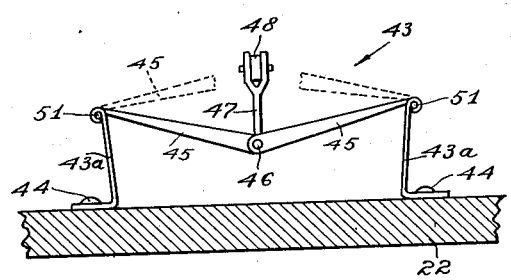
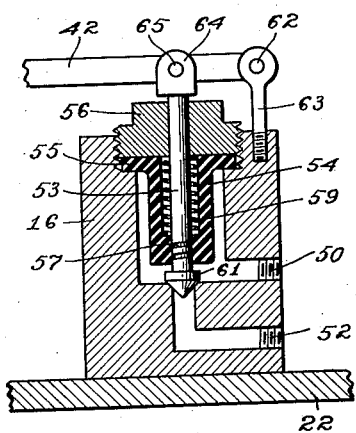
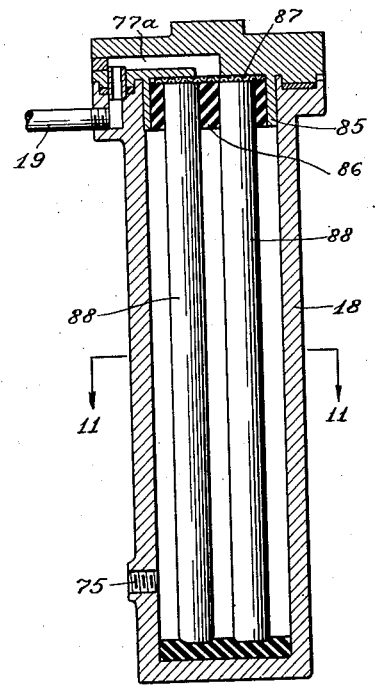
INVENTOR.
Ernest Sweetland Patented Nov. 26, 1935

2,022,164

UNITED STATES PATENT OFFICE 2,022,164

WATER FILTERING AND COOLING MEANS

Ernest J. Sweetland, Piedmont, Calif.

Application November 7, 1932, Serial No. 641,577

3 Claims. (Cl. 210—99)

This invention relates to means of filtering and cooling water for drinking purposes and for such other purposes as filtered and/or cooled water may be used.

My invention relates particularly to filtering and cooling means for use in connection with electric refrigerators for domestic use.

Another object is to provide a filter which is so simple in operation that it can be taken care of by the housewife.

Another object is to provide a filter which by reason of the automatic control system herein described is capable of utilizing a very dense and highly efficient filter medium such as porcelain, yet in a manner which by reason of the particular construction described reduces maintenance cost to a minimum.

Another object is to provide means of obtaining ice water from a domestic refrigerator without the necessity of removing ice cubes from the trays and placing the cubes directly in the water to be cooled. Such practice involves much inconvenience and contamination of the water by handling the ice, whereas the method which I employ is capable of delivering ice water without either inconvenience or contamination.

Another object is to provide adjustable means of regulating the temperature of the water delivered.

Another object is to provide automatic regulating means in combination with storage means so that a filter of small capacity may store up filtered water during the night and at other hours when water is not being consumed, so that a liberal supply is maintained at all times for immediate use.

Another object is to provide a valve in combination with said regulating means that is simple in construction and sensitive in its operation, and which is free from stuffing boxes. By eliminating the stuffing box friction and danger of leakage are both avoided.

Another object is to provide a storage tank adjacent to a refrigerating element in such manner that a portion of the contents of the tank may be maintained in frozen condition without danger of the contents of the entire tank becoming frozen.

Another object is to provide a regulating means for the flow of filtered water that is independent of float valves, and which is capable of utilizing an ordinary water bottle as a storage tank which is at once sanitary, inexpensive and pleasing in appearance.

Referring to the drawings:

Figure 7 is a detailed view of the weight-controlled valve mechanism.

Figure 8 is an elevation of the bias spring mechanism taken on the line 8—8 of Figure 7.

Figure 9 is a detailed sectional elevation of the control valve.

Figure 10 is a side elevation of a modified form of filter in which a plurality of filter elements are used.

Figure 11 is a sectional view on the line 11—11 of Figure 10.

Figure 1:
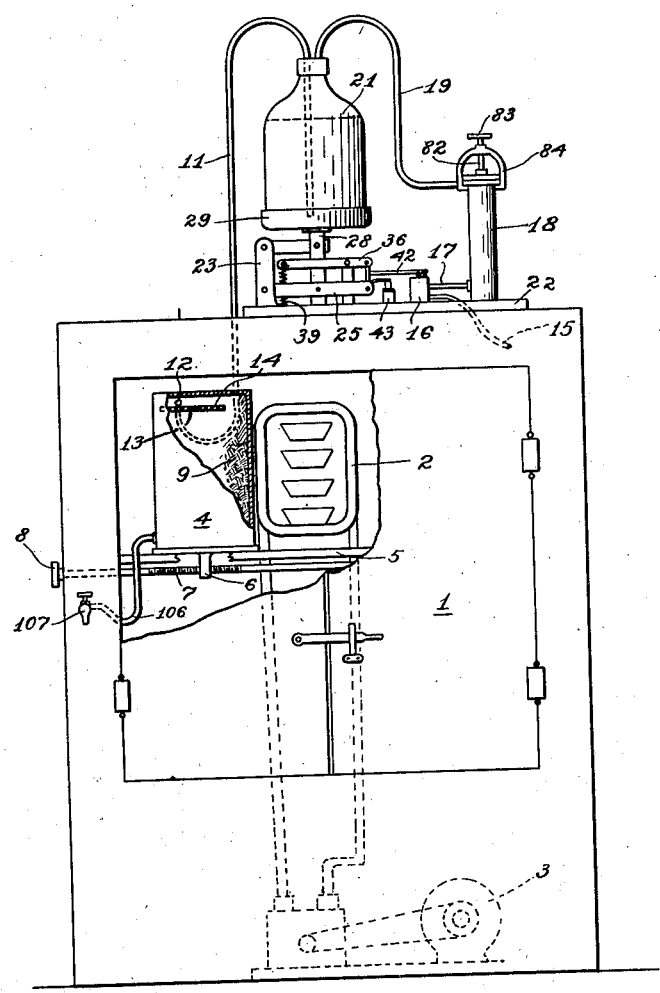
Figure 1 represents an ordinary electric refrigerator which is equipped to supply filtered ice water in accordance with my invention.

Referring to the details and particularly to Figure 1, numeral 1 represents a refrigerator of the type commonly used for domestic purposes and in restaurants and the like. 2 is the cooling coil which is cooled by any standard refrigerating mechanism and is assumed to be connected with the refrigerating unit 3 diagrammatically represented in the base of the refrigerator housing. 4 is a cooling tank for water that is located adjacent to the coil 2. This tank is slidably mounted upon the shelf 5 and is provided with the nut 6 which is secured to the base of the tank 4 so that when the screw 7 is revolved by means of the handle 8 the distance of the tank 4 with relation to the refrigerating element 2 may be varied with a resultant variation in the temperature maintained in the tank. Numeral 9 indicates ice formed in the interior of the tank which occurs when the tank is kept close to the coil 2. Water is supplied to this tank through the siphon tube 11 which is connected to the tank at 12 and delivers the water above the baffle plate 13. Baffle plate 13 is provided with a few small holes 14 through which water may pass downwardly in the event that ice within the cooling tank should extend over sufficiently to stop off the passageway around the end of the baffle plate, which could occur in the event that the tank were left close to the coil 2 for an extended period of time, without water being withdrawn. Water is supplied to the cooling tank 4 through the conduit 15 which is assumed to be connected to the city water supply which delivers water to the apparatus under normal city water pressure. The water passes through the valve 16, conduit 17 and filter 18 and discharge pipe 19 into the bottle 21 where it is held in storage to replace water as it is withdrawn from the tank 4.

The control mechanism which regulates turning on and off of the water in valve 16 will be more clearly understood by reference to Figure 7 which diagrammatically represents a scale mechanism for counterpoising the bottle 21. The numeral 22 designates a base having the upright members 23. Mounted upon the uprights 23 are the levers 24 and 25 which rest upon the knife edge bearings 26 and 27. An upright member 28 supports the water bottle 21 which rests in the tray 29. The upright support 28 is pivoted at 31 to the lever 24 and its weight is carried principally by the knife edge bearing 32. At the end of lever 25 is the pivot 33 which connects link 34 with the lever 36 by means of pivot 35. The lever 36 is fulcrumed in a knife edge bearing 37 to the support 38 and at its extreme end it is secured to the tension spring 39 by means of the pin 41. It will be seen that the apparatus illustrated in Figure 7 diagrammatically illustrates what I term a "scale mechanism", that is, it is responsive to variations in weight so that when the weight in bottle 21 increases it forces the lever 25 downwardly and this in turn through the link 34 and lever 36 communicates an upward pull to the spring 39. It will be understood that there are two of the supports 23 and that the bearings throughout the mechanism are double to provide lateral support. Any well known scale mechanism may be employed.

It is the movement of the scale mechanism levers and particularly the movement communicated by the levers to link 34 which operates the lever 42, which in turn controls the opening and closing of valve 16. That is to say, when the bottle 21 becomes light due to the withdrawal of water an upward motion is communicated to the link 34 which in turn lifts the end of the lever 42 and opens the valve 16 so that the filter is started in operation to replenish the supply of water in the bottle. When the filter has run for a sufficient length of time to fill the bottle to a predetermined level then the link 34 moves downwardly to close the valve 16.

Normally the movement of the valve lever 42 is very slow and gradual and in order to make the valve movement positive I may supply the bias spring mechanism 43 which is shown in elevation in Figure 8 wherein a pair of spring steel uprights 43a are secured by screws 44 to the base 22. Between these springs are the levers 45 which are secured together by the pivot 46. The link 47 is connected to the lever 48 which is secured to the end of the lever 25. This bias spring mechanism has the effect of restraining the upward movement of the levers 45 while water is being withdrawn from the bottle until pivot 46 passes the center line between the pivotal points 51, and as soon as this center line is passed the springs assist the upward motion of lever 48 and all connected parts. Therefore the effect of this bias spring is to promote positive quick action of the valve 16 both in its opening and closing movements. Details of the valve 16 will be understood by reference to Figure 9 in which the valve body is designated by the numeral 16. 50 is the inlet opening and 52 the discharge opening. A special feature of this valve resides in the construction which eliminates the need of a stuffing box and makes the valve extremely sensitive and easy to operate. This is accomplished by having the valve stem 53 secured by vulcanization or otherwise in the rubber element 54. This rubber element is provided with the flange 55 by means of which it is held in place by the nut 56. The stem 53 is grooved or secured at the point 57 to secure more definitely its connection with the rubber element 54. Inside of the rubber element is the spiral spring 59 which serves the double purpose of supporting the walls of the element 54 against collapse due to water pressure, and of returning the valve stem to its seated position. At the lower end of the valve stem is the tapered disc 61 which is ground to fit against the valve seat in the usual manner. The lever 42 is pivotally mounted to the valve body by means of the pin 62 and the upright 63. A clevis 64 and pin 65 pivotally secure the lever 42 to the valve stem 53. It will be clearly understood that the flexibility of rubber element 54 permits sufficient movement of the valve stem and that leakage of water is prevented by the rubber being secured to the valve stem at the point 57 and by the seal formed at the top by the pressure of nut 56 against the flange 55.

Figure 2:
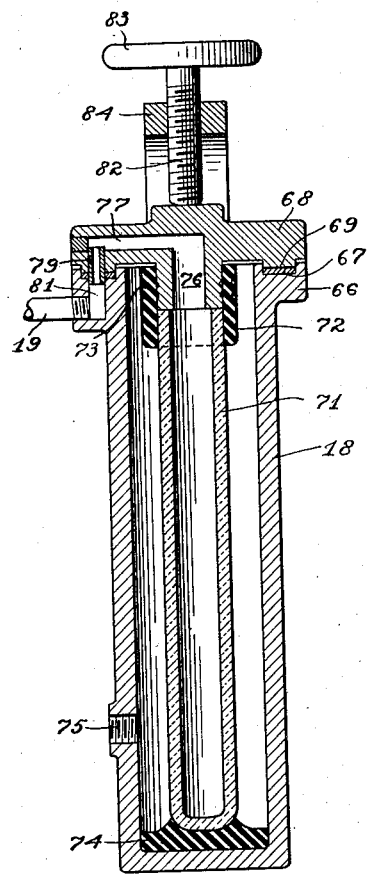
Figure 2 is a sectional elevation showing details of my filter construction.

The filter construction will be clearly understood by reference to Figure 2 wherein the filter casing 18 is provided with the flange 66 and packing 67 which is seated in a groove in the flange. The cover 68 is provided with the annular projection 69 which bears against the packing to insure a tight joint. A feature of novelty in this filter resides in the manner in which the porcelain element 71 is secured to the cover by the rubber ring 72 which makes it possible to remove an old element and insert a new one with the least possible inconvenience. The rubber ring 72 being secured to the cover by means of the wire 73, the porcelain tube is easily slipped into or out of the connection, a rubber pad 74 being provided at the bottom of the casing to hold the tube in place and prevent any downward movement. 75 is the inlet connection to the filter casing and the filtrate finds its way out through the conduits 76 and 77 which connect with the opening through the ferrule 79 and thus lead the filtered liquid out through the conduit 81 and discharge pipe 19. It will be seen that this construction permits delivery of the filtered water through the cover of the filter without the necessity of having any pipe connections attached to the cover so that when it is desired to open the filter to clean or replace the element 71, it is only necessary to loosen the screw 82 by means of the hand wheel 83 when the yoke 84 is removed and the cover with its porcelain element are lifted from the filter casing.

When it is desired to use a plurality of elements I use a construction illustrated in Figure 10 wherein the filter casing is substantially the same as the one illustrated in Figure 2. In this construction the filter is provided with the integral annular ring 85 which retains the perforated rubber plug 86 which contains as many perforations as it is desired to have filter elements. These elements are forced into the rubber plug openings where they are held by friction and their filtrate is delivered into a space in which is seated a disc of wire screen 87 which provides the necessary drainage to carry the filtrate from the tubes into the conduit 77a out of which it is delivered to the pipe 19 in a manner similar to that described with reference to Figure 2. The porcelain elements in this figure are designated by the numeral 88. These elements are shown in cross section in Figure 11.

Figure 3:
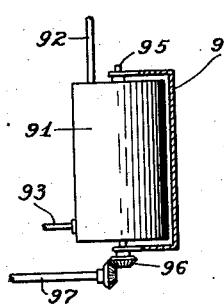
Figure 3 is a modified form of cooling tank which I may employ.
Figure 4:
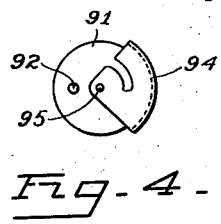
Figure 4 is a plan view of the tank shown in Figure 3.

Other methods of adjusting the temperature of the water in the cooling tank than the one illustrated in Figure 1, may be employed. For example, the cooling tank may be made cylindrical as shown in Figure 3 wherein the tank 91 is provided with inlet 92 and outlet 93. Adjustment of temperature in this case is effected by the shield 94 which is made of asbestos board or similar insulating material. This shield forms a segment of a circle as illustrated in Figure 4 and is pivoted at the top of the pin 95 and has the bevel gear 96 pivotally secured at its lower axis. When this tank is mounted in a refrigerator it is placed so that the shield 94 may be revolved from the outside of the refrigerator by a handle secured to the shaft 97. In this manner the shield 94 may be turned so that the shield is interposed between the cooling coil and the tank, or if it is desired to have the water at the lowest possible temperature, the shield is turned to the opposite side so that there is no insulation between the cooling coil and the tank.

Figure 5:
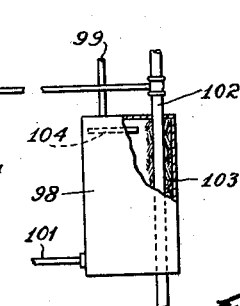
Figure 5 is an elevation of a modified form of tank wherein a branch pipe connected with the refrigerating system passes through the cooling tank and produces ice within the tank.
Figure 6:
Figure 6 is one form of adjusting handle that may be used in connection with the temperature regulating means illustrated in Figure 1.

Figure 5 shows a further modification wherein the tank 98 is provided with water inlet 99 and the outlet 101. In this instance one or more tubes forming a branch from the refrigerating element 2 pass directly through the tank 98. The numeral 102 designates one of these pipes which is represented as being coated with ice 103 on its outer surface. In this instance the inlet 99 and outlet 101 are placed far enough away from the pipe 102 so that under any ordinary conditions the ice would not extend to freeze the inlet and outlet opening. The tank 98 is provided with the baffle 104 which serves the same purpose as the baffle described in connection with tank 4.

As a filter medium for use in my invention I prefer tubes made of unglazed porcelain as such tubes are capable of extremely fine filtration although it is within the province of my invention to substitute any other suitable filtering material in place of the tube 71 and 88. The cooling tank within the refrigerator body may be of any desired shape or form and an essential feature of the invention is that the size of the tank and its position in the refrigerator are so correlated with the cooling coil that ice may form in that portion of the tank adjacent to the coil and will not form on the opposite side where the inlet and outlet connections are located. The baffle plate within the cooling tank performs an important function by causing the incoming water to be delivered to the cooler side of the tank and with the least possible agitation.

From the foregoing description it will be understood that when the bottle 21 is once partially filled and the siphon is placed in operation, water is drawn from the bottle 21 into the tank 4 (from which air has been allowed to escape) and the water remains there to be cooled until it is withdrawn through the flexible tube 106 and faucet 107. The lower end of tube 11 is assumed to be flexible. Water pressure from a city water supply or other source is always in the pipe 15 and as soon as the bottle 21 is lightened by the removal of a portion of the water the spring 39 lifts the bottle and its attendant parts causing the link 34 to lift the lever 42 and open the valve 16 which remains open until the bottle has been filled to a predetermined level, when the weight causes the link 34 to force the lever 42 downward and close the valve.

I may substitute a weight in place of the spring 39. It is also within the scope of my invention to substitute electrical contact means in place of the lever 42 and thus operate an electrical solenoid valve in place of the valve 16.

Where I employ the term "scale mechanism" throughout this application I mean a mechanism which is sensitive to changes in weight and I do not limit myself to the mechanism diagrammatically illustrated in the accompanying drawings, for the same results may be accomplished by the use of various arrangements of levers and springs or weights.

Having thus described my invention what I claim is:

1. A water purifying apparatus comprising: a filter; a vessel to receive the filtrate from said filter; a conduit leading from said filter to said vessel; a valve in said conduit; a support for said receiving vessel; said support including means of counterpoising said vessel; connecting means between said valve and said counterpoising means whereby said valve is automatically opened when the weight of said vessel and contents falls below a pre-determined limit and is automatically closed when the weight of said vessel and contents exceeds a pre-determined limit.

2. The structure of claim 1 wherein bias means is associated with said valve.

3. Fluid controlling apparatus comprising: a vessel to receive fluid; an inlet conduit leading to said vessel; a valve on said conduit; a support for said vessel; said support including means of counterpoising said vessel; connecting means between said valve and said counterpoising means whereby said valve is automatically opened when the weight of said vessel and contents falls below a pre-determined limit and is automatically closed when the weight of said vessel and contents exceeds a pre-determined limit.

ERNEST J. SWEETLAND.